United States Patent
Tsunoda (10) Patent No.: US 8,129,068 B2
(45) Date of Patent: Mar. 6, 2012

(54) FUEL CELL AND FUEL CELL STACK

(75) Inventor: Tadashi Tsunoda, Nerima-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 1175 days.

(21) Appl. No.: 11/974,957

(22) Filed: Oct. 17, 2007

(65) Prior Publication Data

US 2008/0096085 A1 Apr. 24, 2008

(30) Foreign Application Priority Data

Oct. 19, 2006 (JP) .................................. 2006-285204

(51) Int. Cl.
*H01M 8/24* (2006.01)
*H01M 2/14* (2006.01)
*H01M 8/04* (2006.01)

(52) U.S. Cl. ........ 429/457; 429/508; 429/514; 429/460; 429/466

(58) Field of Classification Search .................. 429/428, 429/430, 443–444, 446, 448–449, 452, 545, 429/456–458, 463, 466–467, 469–470, 512–516, 429/535, 508, 460
See application file for complete search history.

(56) References Cited

U.S. PATENT DOCUMENTS

| | | |
|---|---|---|
| 5,418,079 A | 5/1995 | Diethelm et al. |
| 2005/0136316 A1 | 6/2005 | Tsunoda et al. |
| 2005/0142424 A1 | 6/2005 | Homma et al. |
| 2005/0244703 A1 | 11/2005 | Osenar et al. |

FOREIGN PATENT DOCUMENTS

| | | |
|---|---|---|
| EP | 0635896 A1 | 1/1995 |
| EP | 1701402 A1 | 9/2006 |
| EP | 1786055 A1 | 5/2007 |
| JP | 06-260177 | 9/1994 |
| JP | 2002-203579 | 7/2002 |
| JP | 2002-343407 | 11/2002 |
| WO | WO-2006/070932 A1 | 7/2006 |

OTHER PUBLICATIONS

International Search Report for Application No. PCT/JP2007/069893, dated Jan. 25, 2008.
European Office Action for Application No. 07829631.6, dated Aug. 13, 2010.

*Primary Examiner* — Barbara Gilliam
*Assistant Examiner* — Claire L Roe
(74) *Attorney, Agent, or Firm* — Nelson Mullins Riley & Scarborough LLP; Anthony A. Laurentano (57) ABSTRACT

A first separator and a second separator make up separator bodies having the same shape, which are oriented 180° opposite to each other. The first separator has first sandwiching sections sandwiching electrolyte electrode assemblies therebetween, along with fuel gas supply units. A fuel gas supply passage extends in a stacking direction through the fuel gas supply units. The second separator has second sandwiching sections and oxygen-containing gas supply units. An oxygen-containing gas supply passage extends in the stacking direction through the oxygen-containing gas supply units.

9 Claims, 8 Drawing Sheets

FIG. 1

⋅−⋅→ EXHAUST GAS
⎯→ AIR (OXYGEN-CONTAINING GAS)
−−→ FUEL GAS

FIG. 2

⇨ OXYGEN-CONTAINING GAS
⇨ FUEL GAS
⇨ EXHAUST GAS

→ AIR (OXYGEN-CONTAINING GAS)
--→ FUEL GAS

FUEL CELL AND FUEL CELL STACK

BACKGROUND OF THE INVENTION

1. Field of the Invention

The present invention relates to a fuel cell comprising electrolyte electrode assemblies, together with a first separator and a second separator sandwiching the electrolyte electrode assemblies therebetween. Each of the electrolyte electrode assemblies includes an anode, a cathode, and an electrolyte interposed between the anode and the cathode. Further, the present invention relates to a fuel cell stack formed by stacking a plurality of such fuel cells.

2. Description of the Related Art

Typically, a solid oxide fuel cell (SOFC) employs an electrolyte made up of an ion-conductive solid oxide, such as stabilized zirconia. The electrolyte is interposed between an anode and a cathode to form an electrolyte electrode assembly (MEA), and the electrolyte electrode assembly is sandwiched between separators (bipolar plates). In use, a predetermined number of MEAs and separators are stacked together to form a fuel cell stack.

In the fuel cell stack, a fuel gas such as a hydrogen gas and an oxygen-containing gas such as air are supplied to the anode and the cathode of the electrolyte electrode assembly. It is required that the fuel gas and the oxygen-containing gas be supplied to each of the fuel cells.

Figure 8:
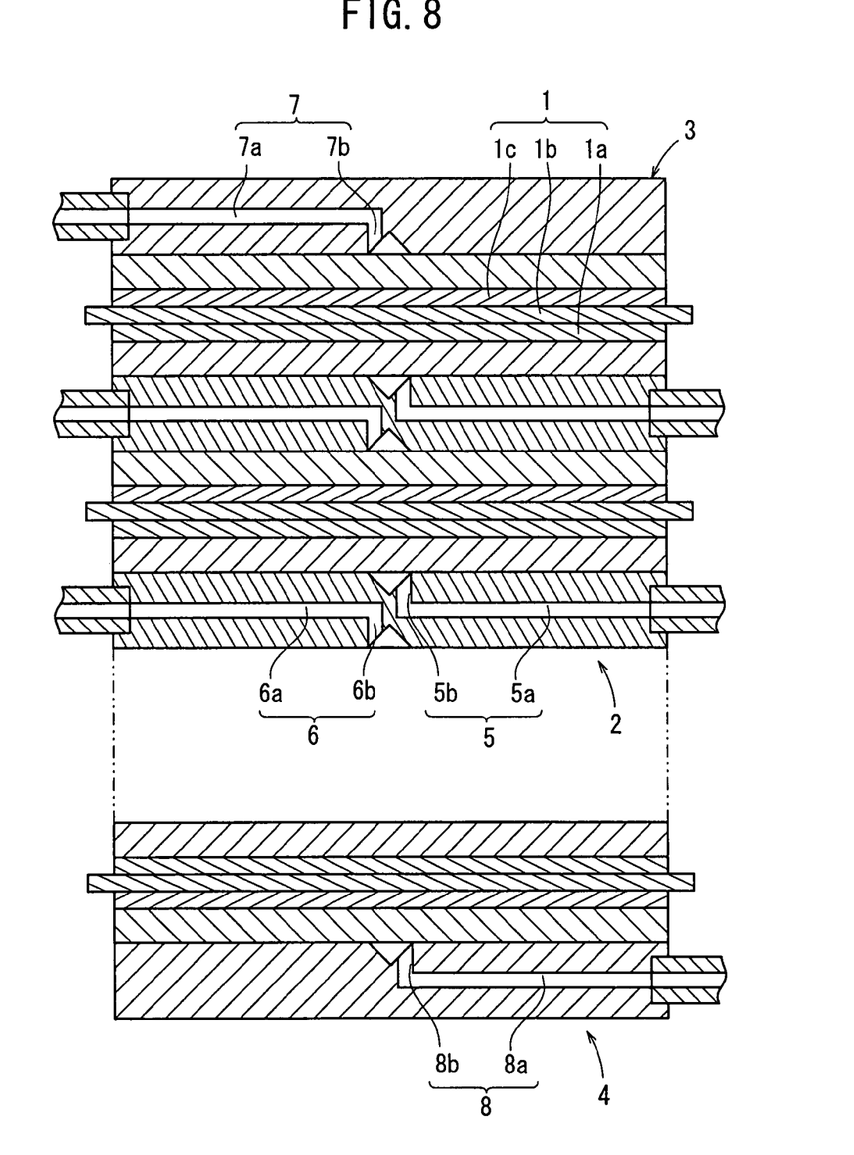
FIG. 8 is a cross sectional view showing a conventional fuel cell.

For example, in the fuel cell disclosed in Japanese Laid-Open Patent Publication No. 2002-203579, as shown in FIG. 8, power generation cells 1 and separators 2 are stacked alternately. A first end plate 3 and a second end plate 4 are provided at opposite ends of the fuel cell in the stacking direction. Each of the power generation cells 1 includes a fuel electrode layer 1a, an air electrode layer 1c, and a solid electrolyte layer 1b interposed between the fuel electrode layer 1a and the air electrode layer 1c.

A fuel supply channel 5a and an air supply channel 6a are formed in the separators 2. The fuel supply channel 5a and the air supply channel 6a extend from the outer circumferential surface of the separator 2 substantially toward the center of the separator 2. An end of the fuel supply channel 5a is connected to a fuel hole 5b, and an end of the air supply channel 6a is connected to an air hole 6b. The fuel hole 5b opens at a substantially central position of the fuel electrode layer 1a of the power generation cell 1, and the air hole 6b opens at a substantially central position of the air electrode layer 1c of the power generation cell 1, to thereby form a fuel gas channel 5 and an air channel 6, respectively.

The first end plate 3 includes an air channel 7 having an air supply channel 7a and an air hole 7b. The second end plate 4 includes a fuel channel 8 having a fuel supply channel 8a and a fuel hole 8b.

However, in the conventional technique, since the fuel gas channel 5 and the air channel 6 are formed inside of the same separator 2, a sealing structure between the fuel gas and the external atmosphere, a sealing structure between the air and the external atmosphere, and a sealing structure for blocking flows between the fuel gas and the air, are required. Therefore, the sealing performance tends to be low, the structure of the separator 2 is complicated, and the cost for producing the separator 2 is high.

Further, in the fuel cell, since the separator 2, the first end plate 3, and the second end plate 4 are provided, three different separator bodies are required. Thus, overall production costs for the fuel cell are high.

SUMMARY OF THE INVENTION

A main object of the present invention is to provide a fuel cell and a fuel cell stack in which the separators thereof possess a simple and economical structure, and wherein the separators sandwiching the electrolyte electrode assemblies are the same. Thus, the overall stack structure is simplified, and production costs are reduced.

The present invention relates to a fuel cell comprising an electrolyte electrode assembly, together with a first separator and a second separator sandwiching the electrolyte electrode assembly therebetween. The electrolyte electrode assembly includes an anode, a cathode, and an electrolyte interposed between the anode and the cathode. Further, the present invention relates to a fuel cell stack formed by stacking a plurality of such fuel cells.

The first separator and the second separator comprise separator bodies, each having the same shape, and which are oriented oppositely to each other. Each of the separator bodies comprises sandwiching section sandwiching the electrolyte electrode assembly therebetween, along with a reactant gas supply unit. A reactant gas channel for supplying a reactant gas along an electrode surface is formed in the sandwiching section. A reactant gas supply passage extends through the reactant gas supply unit in the stacking direction, for supplying the reactant gas to the reactant gas channel.

According to the present invention, the first separator and the second separator comprise separator bodies, each having the same shape, and which are oriented oppositely to each other. Thus, it is unnecessary to produce two different types of separators for sandwiching the electrolyte electrode assemblies. Further, the separator body itself possesses a simple and economical structure. Thus, the separators themselves also possess a simple and economical structure. The overall structure of the fuel cells is simplified, and production costs therefor are reduced easily.

Further, the electrolyte electrode assemblies are sandwiched between one of the separator bodies, which is used as a fuel gas separator, and the other of the separator bodies, which is used as an oxygen-containing gas separator. Thus, the sealing structure is simplified significantly, and overall production costs for the fuel cells are reduced effectively.

Further, dedicated end plates are not required at opposite ends of the fuel cells in the stacking direction, since the separator bodies serve as the end plates. Therefore, in addition to the separator bodies, no special components (dedicated end plates) are required. Thus, a further cost reduction can be achieved advantageously.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
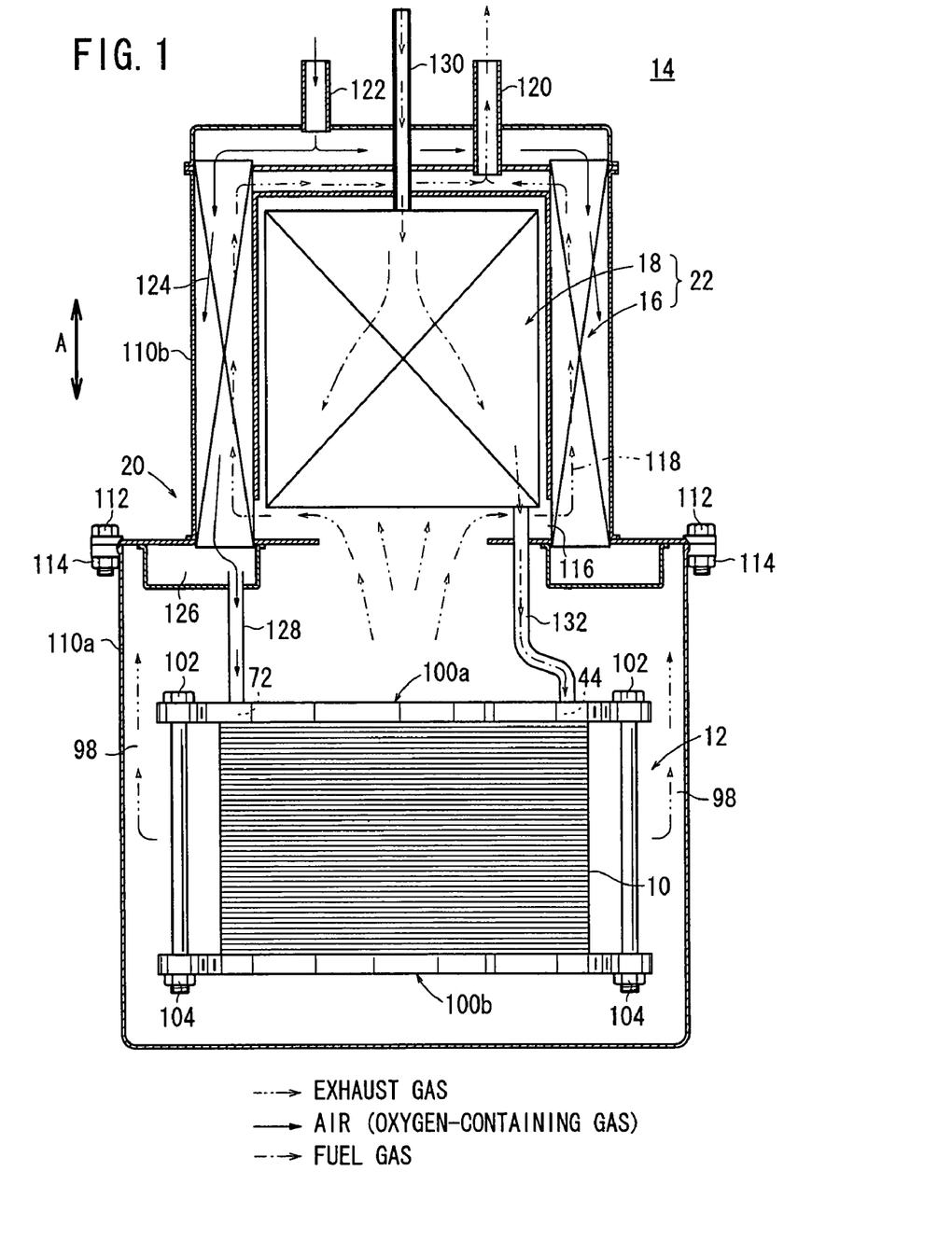
FIG. 1 is a partial cross sectional view schematically showing a fuel cell system, including a fuel cell stack formed by stacking a plurality of fuel cells, according to a first embodiment of the present invention.
Figure 2:
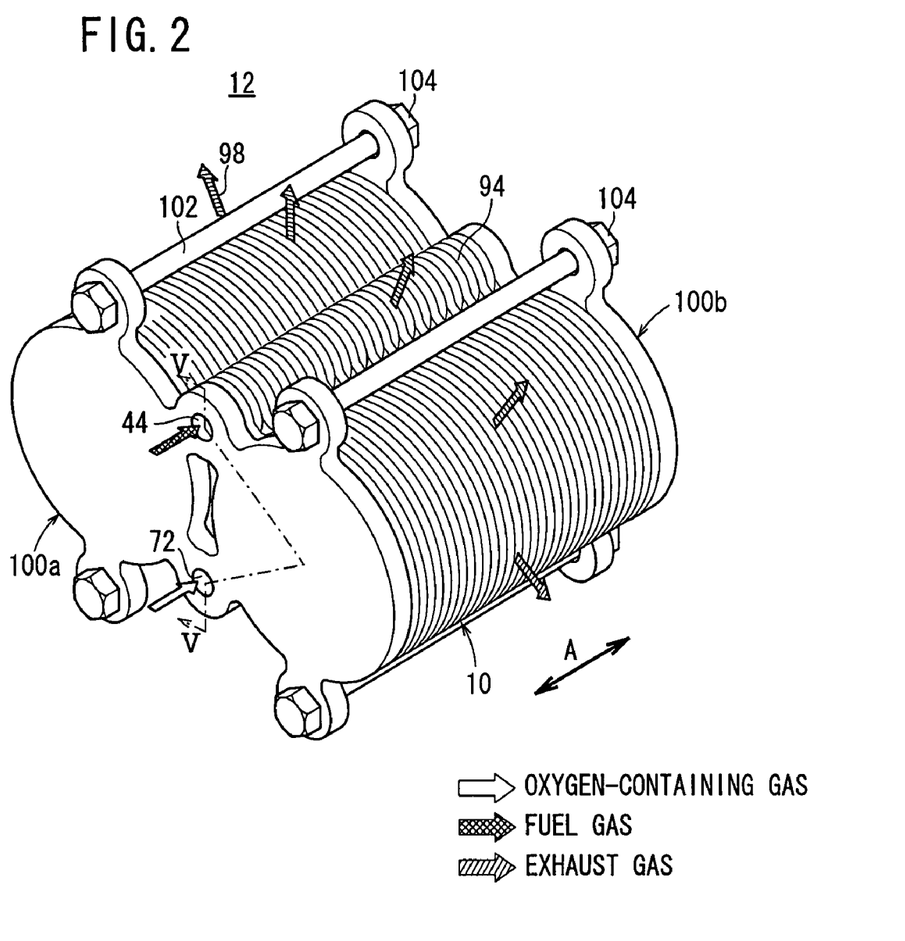
FIG. 2 is a perspective view schematically showing the fuel cell stack.

FIG. 1 is a partial cross sectional view schematically showing a fuel cell system 14, including a fuel cell stack 12 formed by stacking a plurality of fuel cells 10 in the direction indicated by the arrow A, according to a first embodiment of the present invention. FIG. 2 is a perspective view schematically showing the fuel cell stack 12.

The fuel cell system 14 is used in various applications, including stationary and mobile applications. For example, the fuel cell system 14 may be mounted on a vehicle. The fuel cell system 14 includes the fuel cell stack 12, a heat exchanger 16, a reformer 18, and a casing 20. The heat exchanger 16 heats an oxygen-containing gas before it is supplied to the fuel cell stack 12. The reformer 18 reforms a raw fuel, chiefly containing a hydrocarbon, in order to produce a fuel gas. The fuel cell stack 12, the heat exchanger 16, and the reformer 18 are disposed inside the casing 20. In the casing 20, a fluid unit 22, including at least the heat exchanger 16 and the reformer 18, is disposed on one side of the fuel cell stack 12.

Figure 3:
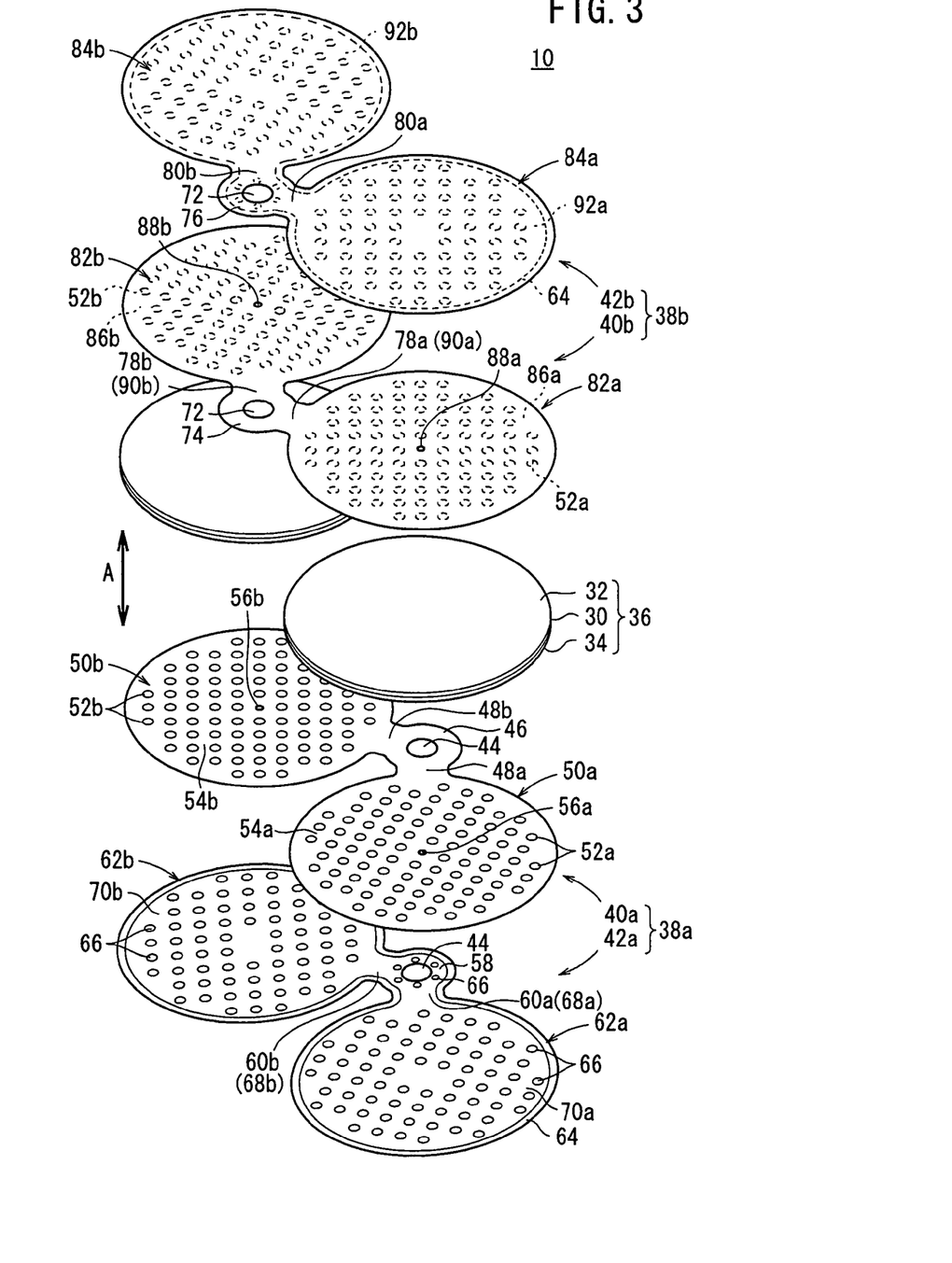
FIG. 3 is an exploded perspective view showing the fuel cell.
Figure 4:
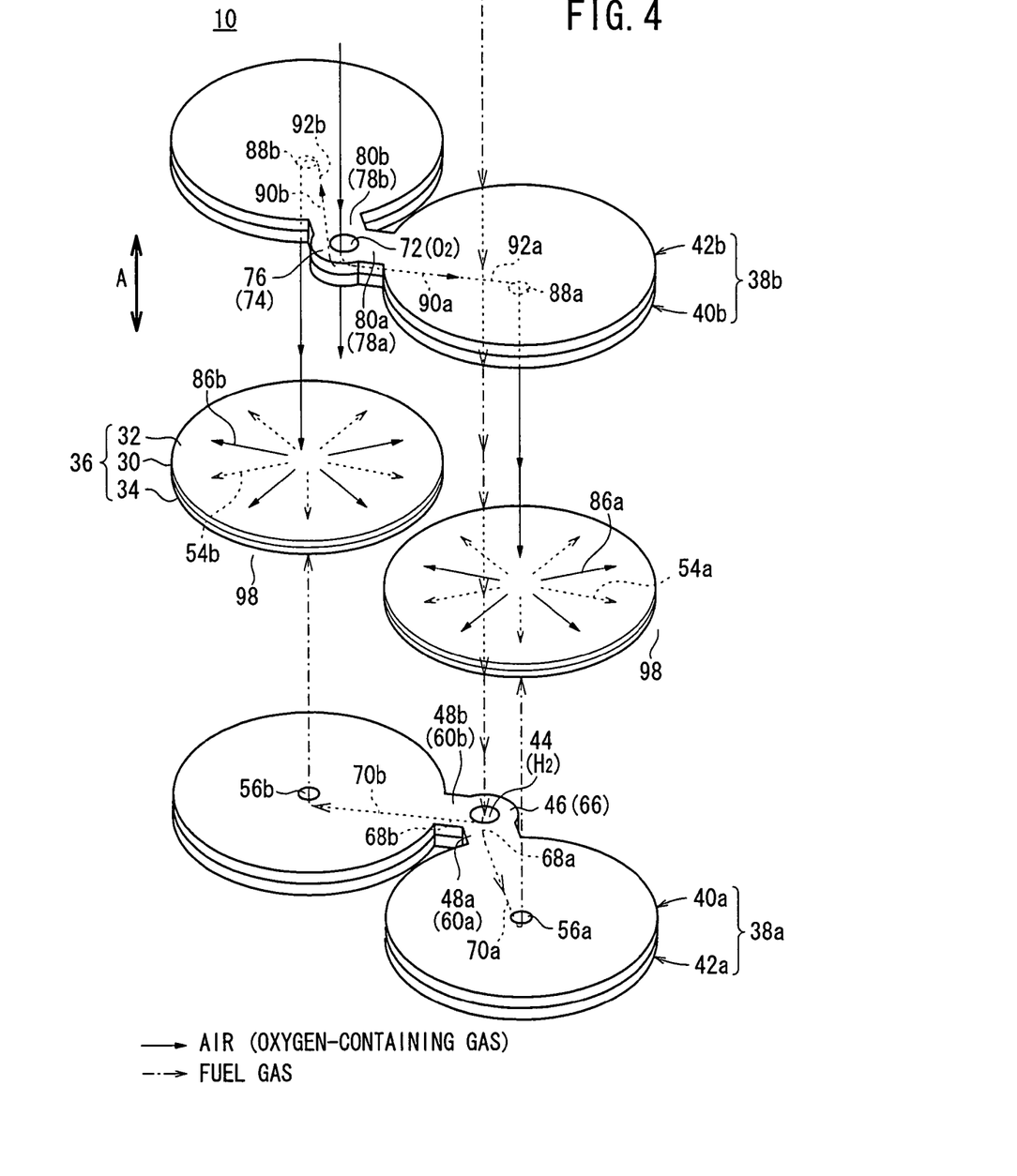
FIG. 4 is a partial exploded perspective view showing gas flows within the fuel cell.

The fuel cell 10 is a solid oxide fuel cell (SOFC). As shown in FIGS. 3 and 4, the fuel cell 10 includes electrolyte electrode assemblies 36. Each of the electrolyte electrode assemblies 36 includes a cathode 32, an anode 34, and an electrolyte (electrolyte plate) 30 interposed between the cathode 32 and the anode 34. For example, the electrolyte 30 is made of an ion-conductive solid oxide, such as stabilized zirconia. The electrolyte electrode assembly 36 has a circular disk shape. A barrier layer (not shown) is provided on at least the outer circumferential edge of the electrolyte electrode assembly 36, for preventing entry of the oxygen-containing gas or the fuel gas thereinto.

The fuel cell 10 is formed by sandwiching a plurality of, e.g., two, electrolyte electrode assemblies 36 between a first separator 38a and a second separator 38b. The first separator 38a and the second separator 38b comprise separator bodies, each having the same shape, and which are oriented 180° opposite to each other.

The first separator 38a includes a first plate 40a and a second plate 42a. The first and second plates 40a, 42a are metal plates of, e.g., a stainless steel alloy. For example, the first plate 40a and the second plate 42a are joined to each other by means of diffusion bonding, laser welding, or by brazing.

The first plate 40a has a substantially planar shape, and includes a fuel gas supply unit (reactant gas supply unit) 46. A fuel gas supply passage (reactant gas supply passage) 44 extends through the fuel gas supply unit 46, for thereby supplying the fuel gas in the stacking direction, as indicated by the arrow A. The fuel gas supply unit 46 is formed integrally with first sandwiching sections 50a, 50b through first bridges 48a, 48b, which extend outwardly from the fuel gas supply unit 46.

The first sandwiching sections 50a, 50b and the electrolyte electrode assemblies 36 each have the same size. Protrusions 52a, 52b are formed on surfaces of the first sandwiching sections 50a, 50b facing the anodes 34. The protrusions 52a, 52b form fuel gas channels 54a, 54b, for supplying the fuel gas along the electrode surfaces of the anodes 34, and also perform a current collecting function. Fuel gas inlets 56a, 56b, for supplying the fuel gas to substantially central regions of the anodes 34, are formed at substantially central positions of the first sandwiching sections 50a, 50b.

The second plate 42a includes a fuel gas supply unit (reactant gas supply unit) 58, wherein the fuel gas supply passage 44 extends through the fuel gas supply unit 58. The fuel gas supply unit 58 is formed integrally with first sandwiching sections 62a, 62b, through two first bridges 60a, 60b that extend outwardly from the fuel gas supply unit 58. An annular ridge 64 is provided on an outer circumferential portion of the second plate 42a. The annular ridge 64 protrudes toward the first plate 40a, and is joined to the first plate 40a.

A plurality of projections 66 are formed on surfaces of the fuel gas supply unit 58, the first bridges 60a, 60b, and the first sandwiching sections 62a, 62b, facing toward the first plate 40a. The projections 66 contact the first plate 40a so as to prevent collapsing thereof, due to loads applied in the stacking direction.

Fuel gas supply channels 68a, 68b, connected to the fuel gas supply passage 44, are formed between the first bridges 48a, 60a, and also between the first bridges 48b, 60b. The fuel gas supply channels 68a, 68b are connected to the fuel gas inlets 56a, 56b, through fuel gas filling chambers 70a, 70b that are formed between the first sandwiching sections 50a, 62a, and also between the first sandwiching sections 50b, 62b.

The first separator 38a and the second separator 38b each have the same shape. The second separator 38b includes a first plate 40b and a second plate 42b, corresponding to the first plate 40a and the second plate 42a. The first plate 40b and the second plate 42b include oxygen-containing gas supply units (reactant gas supply units) 74, 76. An oxygen-containing gas supply passage (reactant gas supply passage) 72 extends through the oxygen-containing gas supply units 74, 76.

In each of the first plate 40b and the second plate 42b, the oxygen-containing gas supply units 74, 76 are formed integrally with sandwiching sections 82a, 82b, 84a, 84b, through two second bridges 78a, 78b and two second bridges 80a, 80b that extend outwardly from the oxygen-containing gas supply units 74 and 76, respectively.

A plurality of protrusions 52a, 52b are provided on surfaces of the second sandwiching sections 82a, 82b which contact the cathodes 32. The protrusions 52a, 52b form oxygen-containing channels (reactant gas channels) 86a, 86b for supplying the oxygen-containing gas along electrode surfaces of the cathodes 32. Oxygen-containing gas inlets (reactant gas inlets) 88a, 88b, for supplying the oxygen-containing gas to substantially central regions of the cathodes 32, are formed at substantially central positions of the second sandwiching sections 82a, 82b.

The second plate 42b is joined to the first plate 40b so as to form oxygen-containing gas supply channels 90a, 90b between the second bridges 78a, 80a as well as between the second bridges 78b, 80b. The oxygen-containing gas supply channels 90a, 90b are connected to the oxygen-containing gas supply passage 72.

Oxygen-containing gas filling chambers (reactant gas filling chambers) 92a, 92b are formed in the second sandwiching sections 84a, 84b. The oxygen-containing gas supply passage 72 is connected to the oxygen-containing gas filling chambers 92a, 92b through the oxygen-containing gas supply channels 90a, 90b.

Figure 5:
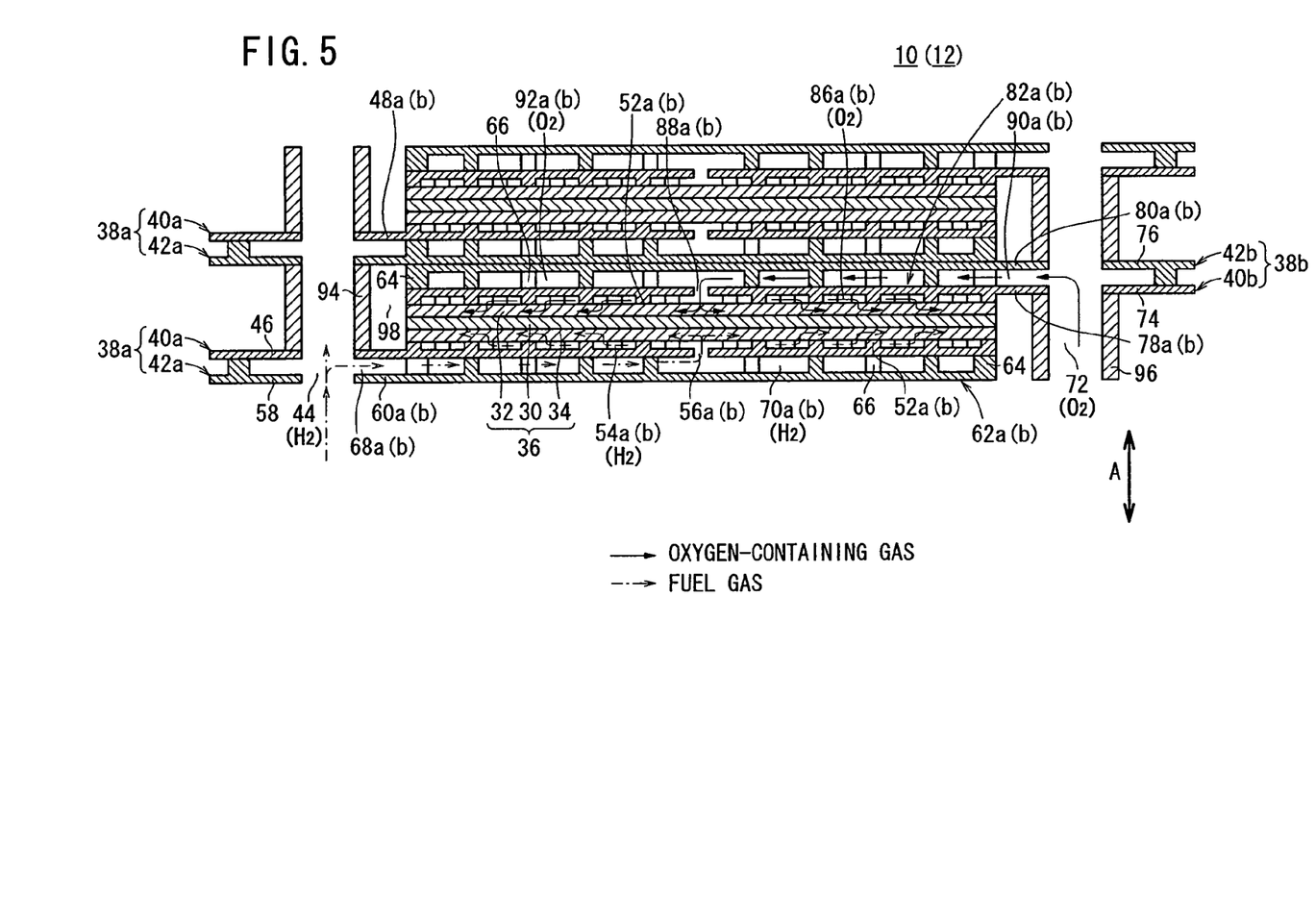
FIG. 5 is a cross sectional view showing the fuel cell stack, taken along line V-V in FIG. 2.

As shown in FIG. 5, a first insulating seal 94 for sealing the fuel gas supply passage 44, and a second insulating seal 96 for sealing the oxygen-containing gas supply passage 72, are formed between adjacent fuel cells 10. The first insulating seal 94 and the second insulating seal 96 are hard and provide good sealing, and cannot be collapsed easily. For example, the first insulating seal 94 and the second insulating seal 96 may be formed from a crustal component material, such as a mica material, a glass material, a ceramic material, or a composite material of clay and plastic. An exhaust gas channel 98 is formed around the electrolyte electrode assemblies 36.

As shown in FIGS. 1 and 2, the fuel cell stack 12 has a first end plate 100a at one end of the fuel cells 10, and a second end plate 100b at the other end of the fuel cells 10 in the stacking direction. The components between the first and second end plates 100a, 100b are tightened together in the stacking direction through a plurality of bolts 102 and nuts 104.

As shown in FIG. 1, the casing 20 includes a first case unit 110a containing the fuel cell stack 12 and a second case unit 110b containing the fluid unit 22. The first case unit 110a and the second case unit 110b are fixed together by bolts 112 and nuts 114.

The reformer 18 has a substantially cylindrical shape and is provided inside of the heat exchanger 16, having a substantially annular shape. The heat exchanger 16 has an opening 116 connected to the exhaust gas channel 98. The exhaust gas channel 98 is connected through the opening 116 to a channel 118 in the heat exchanger 16. The channel 118 is connected to an exhaust gas pipe 120. An air supply pipe 122 is provided in parallel with the exhaust gas pipe 120.

The air supply pipe 122 is connected to a chamber 126 through a channel 124 in the heat exchanger 16. The chamber 126 is connected to an air pipe 128, whereas the air pipe 128 is connected to the oxygen-containing gas supply passage 72 of the fuel cell stack 12.

A fuel gas supply pipe 130 is connected to an inlet of the reformer 18. A reformed gas supply pipe 132 is connected to an outlet of the reformer 18, as well as being connected to the fuel gas supply passage 44 of the fuel cell stack 12.

Operation of the fuel cell system 14 shall be described below.

First, a raw fuel (methane, ethane, propane, or the like) and, as necessary, water, are supplied from the fuel gas supply pipe 130, while an oxygen-containing gas (hereinafter referred to as "air") is supplied from the air supply pipe 122.

The fuel is reformed when it passes through the reformer 18, thereby producing a fuel gas (hydrogen-containing gas). The fuel gas is supplied to the fuel gas supply passage 44 of the fuel cell stack 12 through the reformed gas supply pipe 132. The fuel gas moves in the stacking direction indicated by the arrow A, and flows into the fuel gas supply channels 68a, 68b, which are formed in the first separator 38a of each of the fuel cells 10 (see FIGS. 4 and 5).

The fuel gas flows along the fuel gas supply channels 68a, 68b between the first bridges 48a, 60a, and also between the first bridges 48b, 60b. The fuel gas temporarily fills the fuel gas filling chambers 70a, 70b. The fuel gas flows through the fuel gas inlets 56a, 56b toward the fuel gas channels 54a, 54b. Since the fuel gas inlets 56a, 56b are formed at substantially central positions of the anodes 34 of the electrolyte electrode assemblies 36, the fuel gas flows along the fuel gas channels 54a, 54b from the central regions to outer circumferential regions of the anodes 34.

As shown in FIG. 1, air is supplied from the air supply pipe 122 and flows through the channel 124, while flowing temporarily into the chamber 126. The air then flows through the air pipe 128 connected to the chamber 126. The air is supplied to the oxygen-containing gas supply passage 72 of each of the fuel cells 10.

As described later, exhaust gas, which is discharged into the exhaust gas channel 98, is supplied to the channel 118 of the heat exchanger 16. Therefore, heat exchange is carried out between the exhaust gas and air prior to consumption. Thus, the air is reliably heated to a desired fuel gas operating temperature beforehand.

As shown in FIGS. 4 and 5, air supplied to the oxygen-containing gas supply passage 72 flows along the oxygen-containing gas supply channels 90a, 90b, which are formed between the second bridges 78a, 80a and also between the second bridges 78b, 80b. Then, the oxygen-containing gas temporarily fills the oxygen-containing gas filling chambers 92a, 92b. Thereafter, the oxygen-containing gas flows through the oxygen-containing gas inlets 88a, 88b and into the oxygen-containing gas channels 86a, 86b.

The oxygen-containing gas inlets 88a, 88b are formed at substantially central positions of the cathodes 32 of the electrolyte electrode assemblies 36. Thus, the oxygen-containing gas flows from the central regions toward outer circumferential regions of the cathodes 32.

In each of the electrolyte electrode assemblies 36, the fuel gas is supplied from a central region thereof toward an outer circumferential region on the electrode surface of the anode 34, for thereby inducing an electrochemical reaction at the anode 34. Further, the oxygen-containing gas is supplied from a central region toward an outer circumferential region on the electrode surface of the cathode 32, for thereby inducing an electrochemical reaction at the cathode 32. At this time, oxide ions flow through the electrolytes 30 to the anodes 34 in order to generate electricity through an electrochemical reaction.

The consumed fuel gas, which has passed through the fuel gas channels 54a, 54b, and consumed air that has passed through the oxygen-containing gas channels 86a, 86b, are discharged from the electrolyte electrode assemblies 36 to the exhaust gas channel 98, and are mixed together within the exhaust gas channel 98. The mixed gas is discharged as an exhaust gas, at a relatively high temperature.

In the first embodiment, the first separator 38a and the second separator 38b comprise separator bodies, each having the same shape. Specifically, the first separator 38a and the second separator 38b comprise two separator bodies of the same type, which are oriented 180° oppositely to each other. Thus, it is unnecessary to produce two different types of separators for sandwiching the electrolyte electrode assemblies 36 therebetween. In practice, it is sufficient to produce only the first type of separator 38a.

Further, only the planar first plate 40a and the planar second plate 42a having the annular ridge 64 are required for forming the first separator 38a. Thus, the first separator 38a can be produced easily and economically. Accordingly, the fuel cells 10 are simplified in structure, and overall production costs for the fuel cells 10 are reduced easily.

Further, the electrolyte electrode assemblies 36 are sandwiched between the first separator 38a (one of the separator bodies), which is used as a fuel gas separator, and the second separator 38b (the other of the separator bodies), which is used as an oxygen-containing gas separator. Thus, compared to a structure in which the fuel gas channel and the oxygen-containing gas channel are formed in a single separator, the sealing structure is simplified significantly, and overall production costs for the fuel cells 10 are reduced effectively.

Further, dedicated end plates are not required on opposite ends of the fuel cells 10 in the stacking direction. Also, in the fuel cell stack 12, it is sufficient to use only one type of separator body. Thus, overall production costs for the fuel cell stack 12 can be reduced advantageously.

Further, fuel gas filling chambers 70a, 70b are formed in the first separator 38a, and oxygen-containing gas filling chambers 92a, 92b are formed in the second separator 38b.

With this structure, when the fuel gas is supplied to the first separator 38a, the pressure in the fuel gas filling chambers 70a, 70b increases. Similarly, when the oxygen-containing gas is supplied to the second separator 38b, the pressure in the oxygen-containing gas filling chambers 92a, 92b increases.

Thus, by simply fixing the components of the fuel cell stack 12 using bolts 102 and nuts 104, a load is applied to the components between the first end plate 10a and the second end plate 100b, as a result of an expansion operation caused by internal pressures of the first separator 38a and the second separator 38b. Accordingly, it is not necessary to use a large load applying mechanism, and consequently, the overall size of the fuel cell system 14 can be reduced easily and economically.

Figure 6:
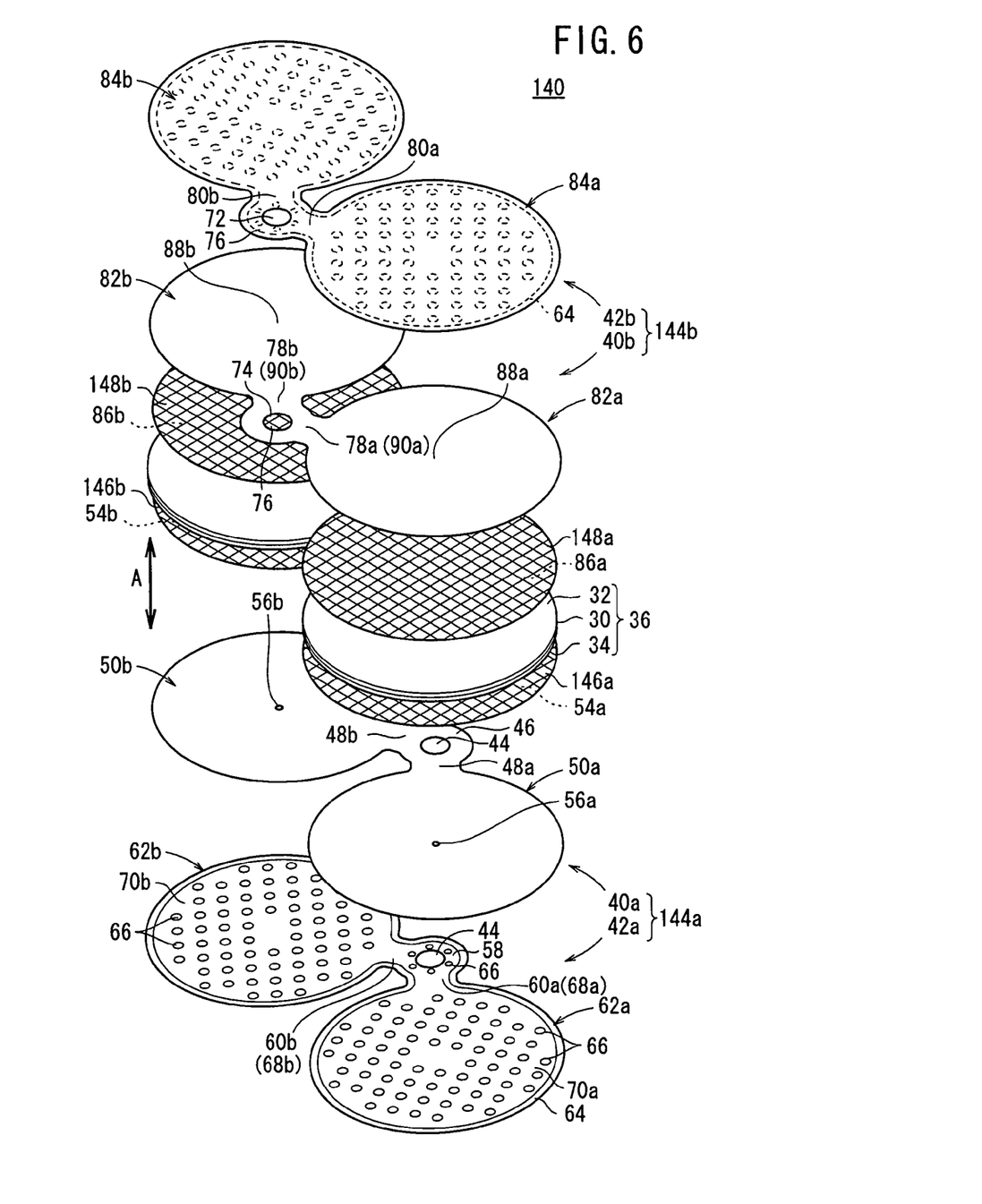
FIG. 6 is an exploded perspective view showing a fuel cell, according to a second embodiment of the present invention.
Figure 7:
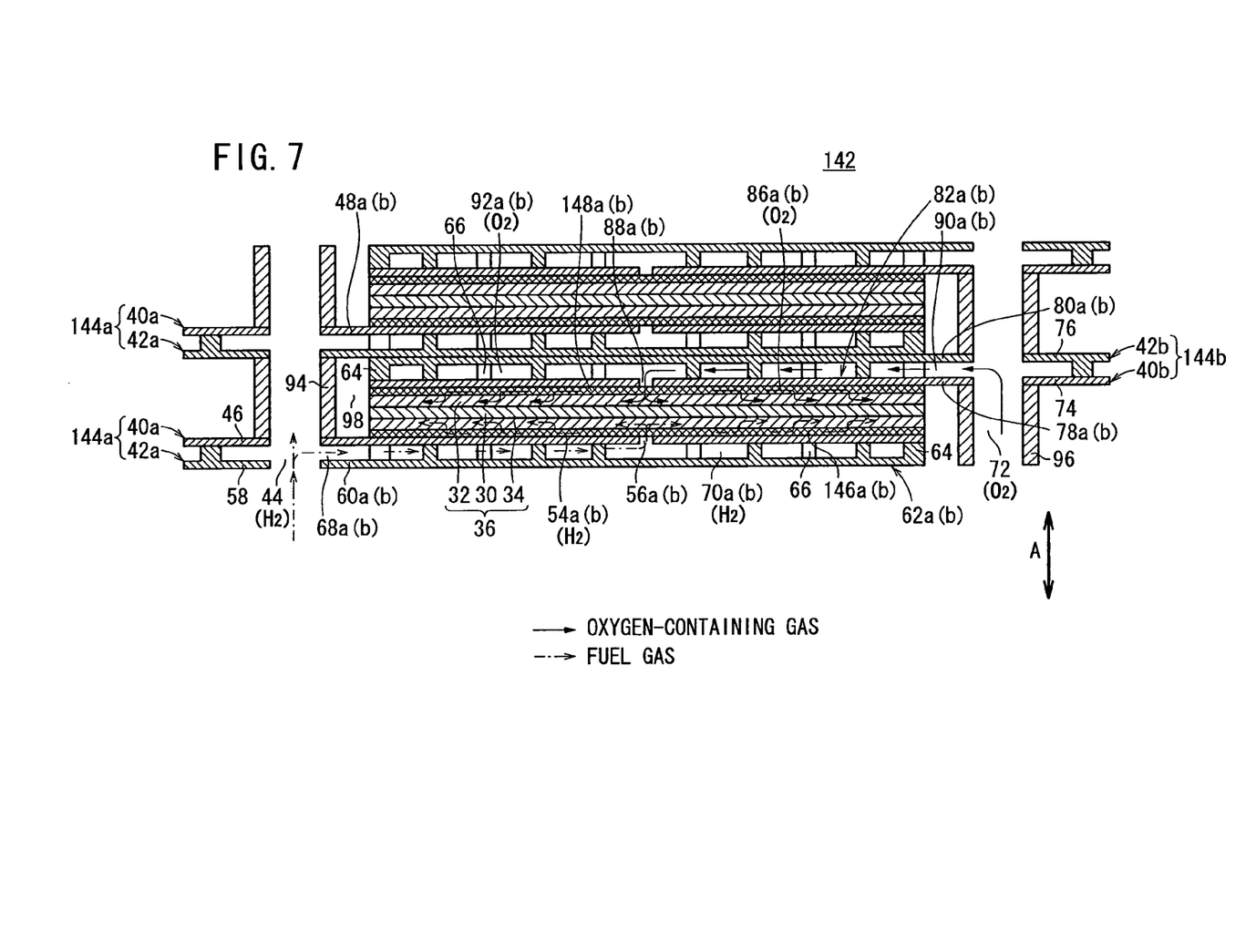
FIG. 7 is a cross sectional view showing a fuel cell stack formed by stacking a plurality of the fuel cells.

FIG. 6 is an exploded perspective view showing a fuel cell 140 according to a second embodiment of the present invention. FIG. 7 is a cross sectional view showing a fuel cell stack 142 formed by stacking the fuel cells 140.

Constituent elements that are identical to those of the fuel cell 10 according to the first embodiment shall be labeled with the same reference numerals, and descriptions of such features shall be omitted.

The fuel cell 140 is formed by sandwiching, for example, two electrolyte electrode assemblies 36 between a first separator 144a and a second separator 144b. The first separator 144a and the second separator 144b comprise separator bodies, each having the same shape, which are oriented 180° oppositely to each other.

A first plate 40a of the first separator 144a includes planar first sandwiching sections 50a, 50b (without the protrusions 52a according to the first embodiment). Electrode members, such as electrically conductive metal meshes (an electrically conductive metal fabric) 146a, 146b, are provided between the first sandwiching sections 50a, 50b and the anodes 34 of the electrolyte electrode assemblies 36.

A first plate 40b of the second separator 144b includes second sandwiching sections 82a, 82b, having planar surfaces facing the cathodes 32 of the electrolyte electrode assemblies 36. Electrically conductive meshes 148a, 148b are interposed between the second sandwiching sections 82a, 82b and the cathodes 32.

Fuel gas channels 54a, 54b are formed in the metal meshes 146a, 146b. The fuel gas, which is supplied to the anodes 34 from the fuel gas inlets 56a, 56b, flows through the fuel gas channels 54a, 54b along the electrode surfaces of the anodes 34. Oxygen-containing gas channels 86a, 86b are formed in the metal meshes 148a, 148b. The oxygen-containing gas, which is supplied to the cathodes 32 from the oxygen-containing gas inlets 88a, 88b, flows through the oxygen-containing gas channels 84a, 84b along the electrode surfaces of the cathodes 32.

Instead of metal meshes 146a, 146b, 148a, 148b, an electrically conductive metal felt (an electrically conductive nonwoven fabric material such as metal felt) may be used.

In the second embodiment, the first separator 144a and the second separator 144b comprise separator bodies, each having the same shape, which are oriented 180° opposite to each other. Thus, the same advantages as in the case of the first embodiment can be obtained. For example, it is unnecessary to produce two different types of separators in each of the fuel cells 140, and therefore the fuel cells 140 are economical.

In addition, the first plate 40a of the first separator 144a includes the planar first sandwiching sections 50a, 50b. Thus, the structure of the first plate 40a is further simplified, and production costs therefor are reduced. It is noted that the same advantages also may be obtained in the first plate 40b of the second separator 144b.

Although the invention has been particularly shown and described with reference to preferred embodiments, it shall be understood that various modifications can be made thereto by persons skilled in the art, without departing from the spirit and scope of the invention as set forth in the appended claims.

What is claimed is:

1. A fuel cell comprising an electrolyte electrode assembly, with a first separator and a second separator sandwiching said electrolyte electrode assembly therebetween, said electrolyte electrode assembly including an anode, a cathode, and an electrolyte interposed between said anode and said cathode, said first separator and said second separator comprising separator bodies having the same shape, said separator bodies each comprising:

a sandwiching section for sandwiching said electrolyte electrode assembly, wherein a reactant gas channel for supplying a reactant gas along an electrode surface is formed in said sandwiching section; and a reactant gas supply unit, wherein a reactant gas supply passage extends through said reactant gas supply unit in a stacking direction, for supplying the reactant gas to said reactant gas channel, wherein the separator body of the first separator is oriented 180° opposite to the separator body of the second separator; and wherein said separator body includes a first plate and a second plate, which are joined together; and a reactant gas filling chamber is formed between said first plate and said second plate, wherein said reactant gas filling chamber is filled with the reactant gas supplied from said reactant gas supply unit.

2. A fuel cell according to claim 1, wherein said separator body comprises a bridge connecting said sandwiching section and said reactant gas supply unit, said bridge having a reactant gas supply channel for supplying the reactant gas from said reactant gas supply passage to said reactant gas channel.

3. A fuel cell according to claim 2, wherein said reactant gas supply unit is formed integrally together with a plurality of said sandwiching sections, through a plurality of said bridges.

4. A fuel cell according to claim 1, wherein a plurality of projections are formed on said first plate contacting said second plate, or are formed on said second plate contacting said first plate.

5. A fuel cell according to claim 1, wherein a plurality of protrusions are formed on said first plate or said second plate, thereby forming said reactant gas channel between said protrusions and said electrolyte electrode assembly.

6. A fuel cell according to claim 1, wherein an electrode member is provided on said first plate or said second plate, thereby forming said reactant gas channel between said electrode member and said electrolyte electrode assembly.

7. A fuel cell according to claim 1, wherein said reactant gas filling chamber is connected to said reactant gas channel and supplies the reactant gas through a reactant gas inlet to a substantially central region of the electrode surface.

8. A fuel cell according to claim 1, wherein:
said first separator comprises the sandwiching section, a fuel gas channel for supplying a fuel gas along the electrode surface of said anode being formed in said sandwiching section, and a fuel gas supply unit, a fuel gas supply passage extending in the stacking direction through said fuel gas supply unit for supplying the fuel gas to said fuel gas channel; and said second separator comprises the sandwiching section, an oxygen-containing gas channel for supplying an oxygen-containing gas along the electrode surface of said cathode being formed in each of said sandwiching section, and an oxygen-containing gas supply unit, an oxygen-containing gas supply passage extending in the stacking direction through said oxygen-containing gas supply unit for supplying the oxygen-containing gas to said oxygen-containing gas channel.

9. A fuel cell stack formed by stacking a plurality of fuel cells, said fuel cells each comprising an electrolyte electrode assembly, with a first separator and a second separator sandwiching said electrolyte electrode assembly therebetween, said electrolyte electrode assembly including an anode, a cathode, and an electrolyte interposed between said anode and said cathode, said first separator and said second separator comprising separator bodies having the same shape, said separator bodies each comprising:

a sandwiching section for sandwiching said electrolyte electrode assembly, wherein a reactant gas channel for supplying a reactant gas along an electrode surface is formed in said sandwiching section; and a reactant gas supply unit, wherein a reactant gas supply passage extends through said reactant gas supply unit in a stacking direction, for supplying the reactant gas to said reactant gas channel, wherein the separator body of the first separator is oriented 180° opposite to the separator body of the second separator; and wherein said separator body includes a first plate and a second plate, which are joined together; and a reactant gas filling chamber is formed between said first plate and said second plate, wherein said reactant gas filling chamber is filled with the reactant gas supplied from said reactant gas supply unit.

* * * * *